(12) United States Patent
Martin

(10) Patent No.: US 8,758,610 B2
(45) Date of Patent: Jun. 24, 2014

(54) APPARATUS FOR RECOVERING OIL FROM A BODY OF WATER

(76) Inventor: Sky Bleu Martin, Seattle, WA (US)

( * ) Notice: Subject to any disclaimer, the term of this patent is extended or adjusted under 35 U.S.C. 154(b) by 358 days.

(21) Appl. No.: 13/401,404

(22) Filed: Feb. 21, 2012

(65) Prior Publication Data

US 2012/0217193 A1 Aug. 30, 2012

Related U.S. Application Data

(60) Provisional application No. 61/447,318, filed on Feb. 28, 2011.

(51) Int. Cl.
*C02F 1/40* (2006.01)
*E02B 15/10* (2006.01)
*E02B 15/04* (2006.01)

(52) U.S. Cl.
CPC .............. *E02B 15/045* (2013.01); *E02B 15/104* (2013.01); *C02F 1/40* (2013.01); *Y10S 210/924* (2013.01)
USPC ........ 210/237; 210/242.4; 210/400; 210/499; 210/502.1; 210/924

(58) Field of Classification Search
CPC ........ C02F 1/40; C02F 1/285; C02F 2201/32; C02F 2103/007; E02B 15/045; E02B 15/046; E02B 15/047; E02B 15/048; E02B 15/101; E02B 15/104
USPC ........... 210/236, 237, 241, 242.3, 242.4, 400, 210/499, 502.1, 924; 414/137.7
See application file for complete search history.

(56) References Cited

U.S. PATENT DOCUMENTS

| | | | | |
|---|---|---|---|---|
| 3,543,953 A | * | 12/1970 | Ponsen | 414/141.5 |
| 3,968,041 A | | 7/1976 | DeVoss | |
| 3,992,292 A | * | 11/1976 | Grimes et al. | 210/671 |
| 4,362,631 A | * | 12/1982 | Bocard et al. | 210/776 |
| 2011/0309006 A1 | * | 12/2011 | Crouse | 210/170.05 |

FOREIGN PATENT DOCUMENTS

GB 2095571 A * 10/1982 .............. E02B 15/04

* cited by examiner

*Primary Examiner* — Matthew O Savage
(74) *Attorney, Agent, or Firm* — Not Just Patents LLC; Wendy Peterson

(57) ABSTRACT

An apparatus to convey and seal a material recovery and separation container (MRSC) that is water and air permeable for in-place material recovery and separation of a primary product of clean water and clean air and a secondary product of floating contaminants such as an oil spill or other pollution from a composite mixture of products at the surface of water or at depths (oil plume). The apparatus has a horizontal platform base for support and to provide a lay-down area, provide an operator support area, and provide a structure for connecting to a local containment boom and standoff. One embodiment is a hook and rail conveying system brings the MRSC to the composite mixture, through the composite mixture for collection, to a container closing area and to a lay-down area. The MRSC is closed after filling.

5 Claims, 3 Drawing Sheets

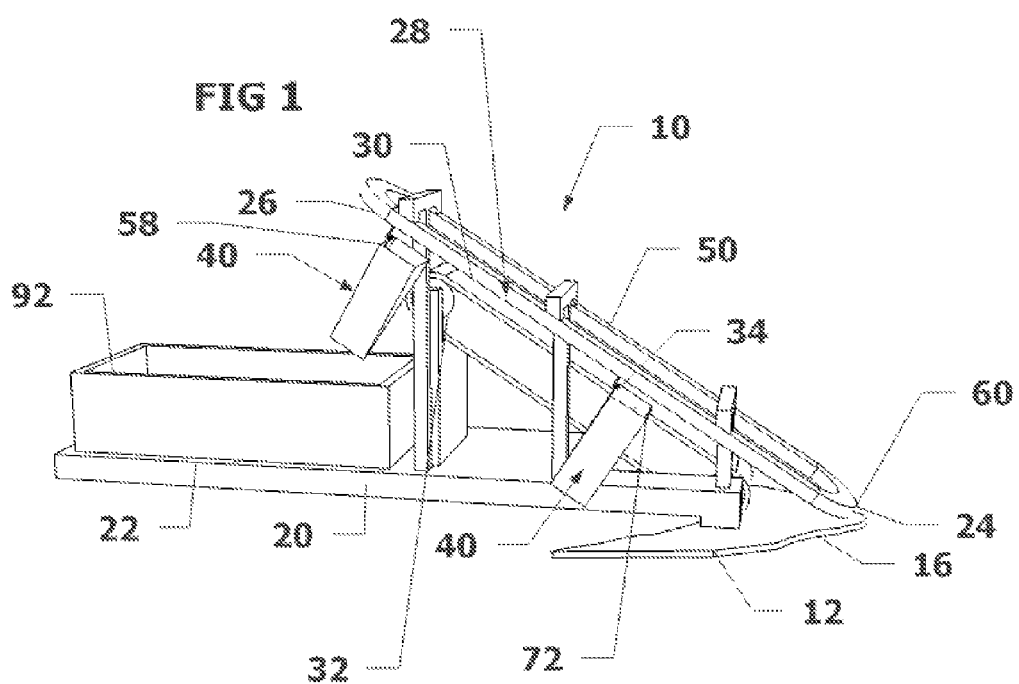

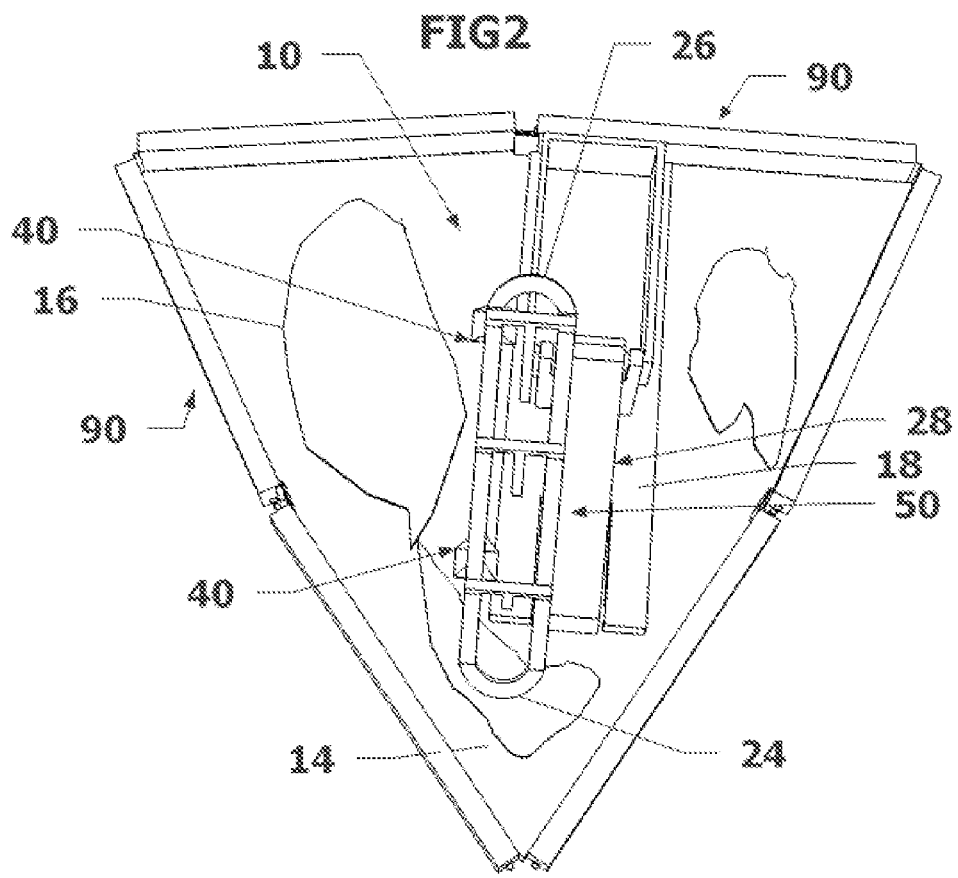
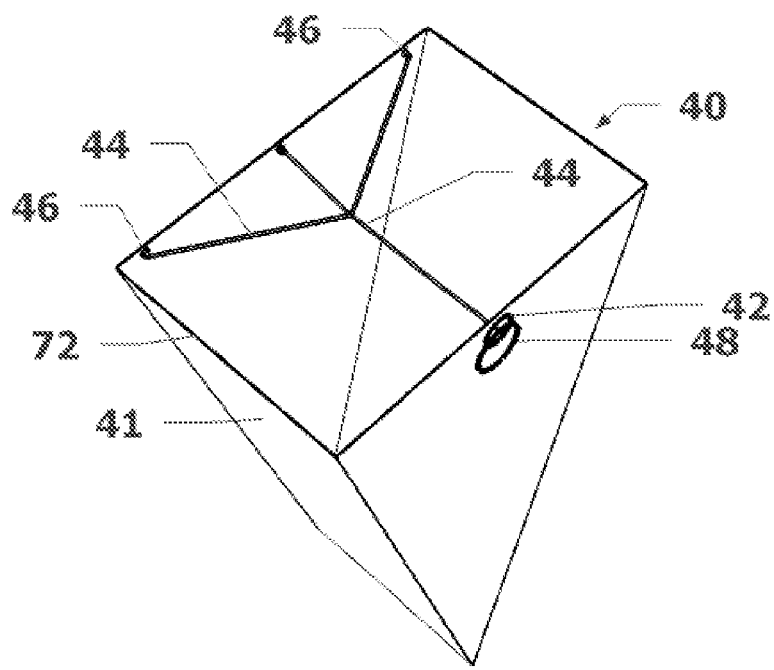

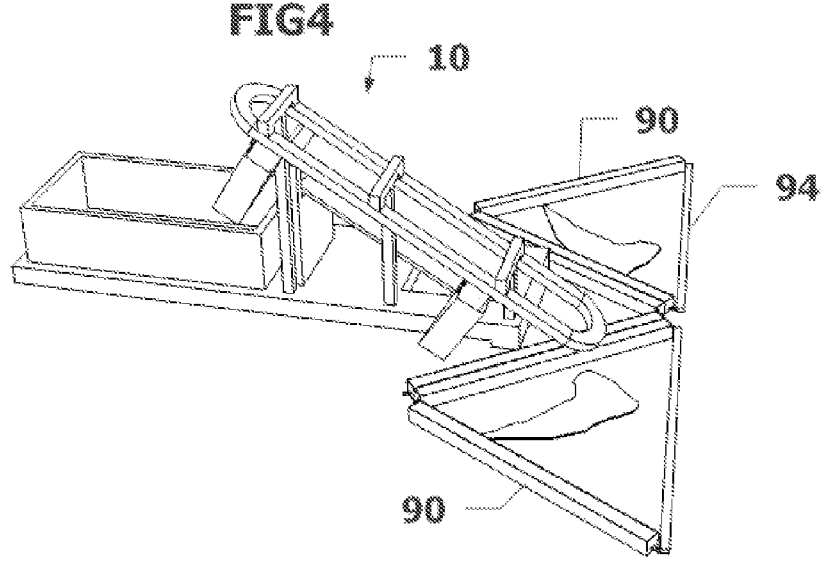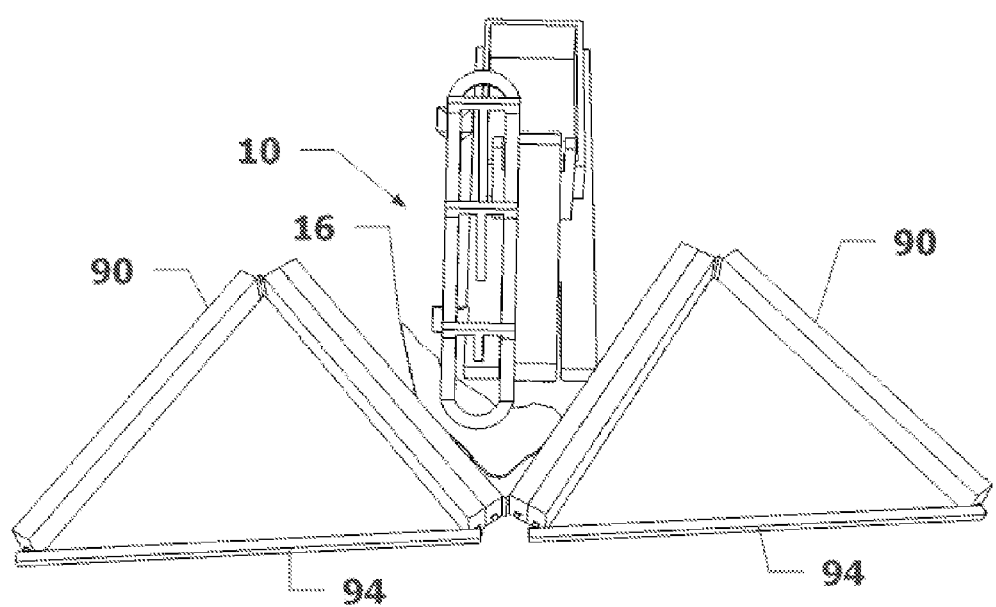

APPARATUS FOR RECOVERING OIL FROM A BODY OF WATER

CROSS-REFERENCE TO RELATED APPLICATIONS

This application claims the benefit of provisional application 61/447,318 titled "In-Place Material Recovery and Separation Apparatus" filed on Feb. 28, 2011 which is incorporated by reference in its entirety. Related subject matter is disclosed in my U.S. patent application Ser. No. 12/137,182 filed Jun. 11, 2008 (now abandoned) and Ser. No. 13/007,767 filed Jan. 17, 2011 (which is a continuation-in-part of Ser. No. 12/137,182) and PCT/US09/45099 filed May 23, 2009, now abandoned.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

The present invention relates to an In-Place Material Recovery and Separation Apparatus and Method of Use for recovering clean water and clean air from a floating composite mixture of oil and other floating contaminants. The recovery and separation process is accomplished at the removal site wherever the invention is located.

Oil spills have a disastrous effect on water quality, marine life, and on land areas in the vicinity of a spill. Many oil spill skimming devices use very expensive conveying and separation techniques that are slow, very costly, difficult-to-use, environmentally unfriendly and have low oil recovery rates and oil recovery efficiencies.

SUMMARY OF THE INVENTION

The present invention uses inexpensive and easy-to-use conveying techniques and an inexpensive separation material to meet objectives. The whole process can be done manually using simple machines and when large volumes are involved, greater speed and efficiency can be accomplished by automating steps and using more complex machines.

The present invention is designed to have a modular, transportable focus where a single unit or a plurality of units can be used together and unit(s) can be towed or otherwise transported to locations or may be placed on ships and operated off the ships as appropriate for the recovery operation.

The present invention presents a simple six step method and machine for recovering and separating the primary products of clean water and clean air and the secondary products of oil and other floating contaminants from a composite mixture of these primary and secondary products at the surface of a body of water.

The first method step involves conveying a Material Removal and Separation Container (hereafter referred to as "MRSC") to a water surface where a composite mixture such as an oil spill is floating. The MRSC are made from any suitable material that is water and air permeable but retains contaminants removed from the water such as spilled oil. Suitable materials include geosynthetic fabrics where variable mesh size can be used to retain micro and nano-sized particles or larger sized mesh can be used for faster flow where micro and nano-sized particle retention is not an objective. The MRSC are shaped into different configurations such as bags, cones, elongated cones, or tubes having different size openings defined as MRSC fillport size. The machine component for this step is a conveyance device including but not limited to a hook to hold the MRSC that runs on a manually operated or automated rail system, a hook to hold the MRSC that is held and controlled by a manually operated or automated block and tackle system, a hook to hold the MRSC that is manually operated using a manual hoist/trolley system or an automated hoist/trolley system.

The second method step is conveying a MRSC (held in the open fillport position) through and along the surface or other location of the composite mixture and collecting the composite mixture in the MRSC. The primary products (clean air and clean water) start flowing out of the sides and bottom of the MRSC almost immediately and passively from compression of material inside the MRSC. The MRSC material is very lightweight and while collecting floating secondary products, it is easy to pull and navigate through the composite mixture while retaining the floating secondary products (oil and other contaminants). This step can be accomplished most efficiently by using a booming device such as the Enviro Boom® (Enviro Boom® is a registered trademark of Skyler Enterprises) to collect the composite mixture into a small area to maximize the depth of the composite mixture in a local area in front and/or off to the side of the invention where the depth of the composite mixture can be controlled at levels of composite mixture depths of at least 1" for high efficiency or a less composite mixture depth for lower efficiency. The machine for this conveying step can be the same machine used in the first step or may be a machine specifically suited for water use. This step is not limited to applications where the MRSC is pulled through a surface composite mixture at the surface of the water but also can be used applications where the MRSC is dragged through a composite mixture underwater such as an oil plume.

The third method step is conveying the filled MRSC away from the surface of the water. The machine for this conveying step can be the same machine used in the first step and may be supplemented by another machine such as, but not limited to, a conveyor belt. A filled MRSC may hold volumes of secondary products ranging from just gallons to hundreds of gallons, depending on the objective of the collection and the size of the container. Supplementary devices may be needed where the weight of the filled MRSC exceeds the lifting capacity of the first conveying machine or where greater speed of conveyance is an objective.

The fourth step is closing the filled filter MRSC using methods such as but not limited to cinching, sewing, zipping, heat sealing, ultrasonic welding, spring elements or other means. A spring clip/grommet cinching closure method utilizes a bag or tube type MRSC with a grommet hole near the top of the fillport that is large enough for a cinched shut neck of an MRSC to fit through. A plurality of spring clips near the fillport edge of the MRSC are held in a closed or narrow position by a plurality of gathering, cinching and tension lines while the gathered, cinched fillport and spring clips are pulled through the grommet hole. On releasing the tension on the gathering, cinching and tension lines, the spring clips are released into an open or wide position sealing the fillport of the container.

The fifth method step is conveying the filled MRSC to a lay-down area such as, but not limited to a floor section of the platform or a storage tank. The machine for this conveying step can be the same machine used in the first step and may be supplemented by another machine such as, but not limited to, a conveyor belt.

The six method step is an active or passive step to accomplish further removal of primary product. MRSC in a lay-down area will passively continue to remove primary product naturally through gravity and compression of MRSC contents from the height of an individual MRSC and any additional MRSC that are stored on top of each other. Supplemental removal devices such as a scraper or roller can be used to speed up the process of primary product removal or to remove material from the outside of the MRSC. Filled MRSC containing almost exclusively secondary product can be transported away or can be temporarily returned to the water for later pickup.

Filled MRSC can be scraped while they are being conveyed away from the water to remove composite mixture from the outside of the MRSC or compressed by rollers to remove primary products from the inside or outside of the MRSC while it is being conveyed. Additional large fillport MRSC may be stationed beneath the conveying zones to catch incidental loss of material from the MRSC or the conveying equipment to prevent return of this material to the clean water.

Geotextiles are selected for desired permittivity (through speed of water flow) and desired water quality characteristics to meet cost objectives and water quality objectives. Clean water and clean air can be returned immediately to the ambient surroundings or can be collected for testing or further treatment.

BRIEF DESCRIPTION OF THE SEVERAL VIEWS OF THE DRAWING

FIG. 1 is a perspective view of the apparatus on a platform surrounded by open water.

FIG. 2 is a top view of the apparatus in a local containment area created by a plurality of Enviro Boom® Local Containment Booms and Standoffs.

FIG. 3 is a perspective view of a Material Recovery and Separation Container.

FIG. 4 is a perspective view of the apparatus on a platform operating in a dense composite mixture collection area created by a plurality of Enviro Boom®.

FIG. 5 is a top view of the apparatus on a platform operating in a dense composite mixture collection area created by a plurality of Enviro Boom®.

DETAILED DESCRIPTION OF THE INVENTION

An apparatus 10 for recovering and separating the primary products of clean water and clean air and the secondary products of oil and other floating contaminants from a composite mixture 16 of these primary and secondary products at the surface 12 of a body of water; comprising a platform base 20 to support the apparatus 10 and provide a lay-down area 22; an inclined plane conveying assembly 28; a vertical support and conveying assembly 50; and a material recovery and holding tank 92 on lay-down area 22. Options include rollers to compress filled Material Recovery and Separation Containers (MRSC) 40 to speed removal of primary product; motorized inclined plane belts 32; motorized inclined plane belts with absorbents 34; fluid extraction devices such as scrapers and rollers to extract secondary product from the absorbent belt 34; platforms 20 that are mounted on a ship or boat; platforms 20 that are mounted on a dock; platforms 20 mounted on a shoreline with extended inclined plane conveying means and extended vertical hanging and conveying means to allow operation from shore; platforms 20 with holding tanks 92 with passive or active liquid expulsion means; and platforms 20 with conveying assemblies 28, 50 for movement of secondary product filled MRSC 40 away from the lay-down area 22.

Referring to FIG. 1, the a material recovery and separation apparatus 10 includes vertical support and conveying means 50 that is supported by the horizontal platform 20. The conveying means 50 includes a rail system having a submerged distal end 24 submerged in the body of water and a proximal end 26 disposed directly above a lay-down area 22. The lay-down area 22 can optionally contain a holding tank 92 for storing filled containers 40. The vertical support and conveying means 50 includes a retention device, such as a hook, that is adapted to engage the grommet to attach the container to the rail system. The hook 58 and rail system convey the MRSC 40 to the water line 12 and composite mixture 16 to be recovery and separated and convey the MRSC 40 through the water 12 to pick up the composite mixture 16. An inclined plane assembly 30 positioned immediately below a portion of the rail system may provide supplemental vertical support to filled MRSC 40 returning to the proximal end 26 to be placed in the lay-down area 22 which may contain a holding tank 92 to provide a contained storage area. The inclined plane may be motorized 32 (conveyer belt) and may contain absorption material 34 to aid in the removal of composite mixture 16 from the surface of the water 12 and to absorb incidental spills of composite mixture 16 and composite mixture 16 from the outside of the MRSC 40.

Referring to the top view of the apparatus in FIG. 2, the material recovery and separation apparatus 10 is shown inside of a local containment area 14 created by a plurality of Enviro Boom® Local Containment Booms 90. The composite mixture 16 is held in a local area that can be made smaller and smaller to bring the composite mixture 16 directly to where the material recovery and separation apparatus 10 is working. Unfilled MRSC 40 are shown being conveyed from near the proximal end 46 to the submerged distal end 24. An inclined plane assembly 28 is shown to supplement the vertical support assembly 50 in conveying filled MRSC 40 from the water. An operator support area 18 is shown for a plurality of workers to move around in to support the operation as needed.

Referring to the perspective view of the MRSC 40 in FIG. 3 showing one method of MRSC 40 closure after filling, a grommet 42 large enough to allow a cinched MRSC fillport 72 to pass through is shown. A cinching ring 48 is connected to a line 44 that connects to a plurality of spring clips 46 that are fastened to the MRSC 40. These spring clips 46 are held in an closed, narrow position when under tension from the line 44 and passed through the grommet 42. When the tension on the line is released after the fillport 72 is pulled through the grommet 42, the spring clips open wide and secure the MRSC 40 cinched and closed. Alternative methods of closing the MRSC 40 after filling include but are not limited to cinching, sewing, zipping, heat sealing, ultrasonic welding, and the use of other spring closure elements.

The geotextiles used to make a MRSC can be uniform in size or can be shaped with funnel or other openings with a range of opening or fillport sizes. A small fillport ranges from 0.5-1.0 ft$^2$. A medium fillport size ranges from 1.0 to 5.0 ft$^2$. A large fillport size ranges from 5.0 to 25 ft$^2$. Fillports can be any suitable shape such as a narrowing 'funnel shape' or can be circular in shape, rounded rectangular, rectangular, square or other shapes.

Referring to the perspective view of the apparatus in FIG. 4, the material recovery and separation apparatus 10 is shown outside of a collection of composite mixture created by a plurality of Enviro Boom® Local Containment Booms 90. A plurality of securing bars 94 located above or below the water as needed hold the Enviro Boom® 90 in a desirable configuration.

Referring to the top view of the apparatus in FIG. 5, the material recovery and separation apparatus 10 is shown outside of a collection of composite mixture created by a plurality of Enviro Boom® Local Containment Booms 90. A plurality of securing bars 94 located above or below the water as needed hold the Enviro Boom® 90 in a desirable configuration.

Two performance measurements are used to rate the apparatus and its efficiency: Estimated Oil Recovery Rate (ORR) and Oil Recovery Efficiency (ORE):
 1. ORR: Total volume of oil recovered by the device per unit of time (water that is recovered along with the oil is not included in this calculation).
 2. ORE: The ratio of the volume of oil recovered to the volume of total fluid recovered.

These are defined using the following formulas:

$$\text{ORR (Oil Recovery Rate, gallon/min (GPM))} = V\text{oil}/t$$

$$\text{ORE (Oil Recovery Efficiency, \%)} = (V\text{oil}/V\text{total fluid}) \times 100$$

V oil=Volume of oil recovered, gallons (dewatered)
t=Elapsed time of recovery, minutes
V total fluid=Volume of total fluid recovered, gallons (water and oil)

Variations in apparatus parameters (size of MRSC, mesh size of MRSC, size and shape of fillport, etc.) ideally allow for a normal range of 30-50% ORE (where speed of cleanup is highest); to a mid-range efficiency of 50-70%; to a high range efficiency of 70% or greater.

The above disclosure is sufficient to enable one of ordinary skill in the art to practice the invention, and provides the best mode of practicing the invention presently contemplated by the inventor. While there is provided herein a full and complete disclosure of the preferred embodiments of this invention, it is not desired to limit the invention to the exact construction, dimensional relationships, and operation shown and described. Various modifications, alternative constructions, changes and equivalents will readily occur to those skilled in the art and may be employed, as suitable, without departing from the true spirit and scope of the invention. Such changes might involve alternative materials, components, structural arrangements, sizes, shapes, forms, functions, operational features or the like.

What is claimed is:

1. An apparatus for recovering oil floating on or below a surface of a body of water comprising:
 a separation container formed of a fabric that is permeable to air and water and is capable of retaining oil, said container having fill port, and a grommet attached to the fabric proximate the fill port;
 a horizontal platform to provide a lay-down area for the container, to provide an operator support area, and to provide a structure for connection to a local containment boom;
 a vertical support and conveying assembly fixedly attached on the platform, the vertical support and conveying assembly including a rail system having a proximal end disposed directly above the lay-down area and a distal end submerged in the body of water; and,
 a retention device adapted to engage said grommet to attach the container to the rail system;
 wherein said rail system is adapted to convey the container into the body of water to collect the oil and is adapted to convey the container out of the body of water to the lay-down area.

2. The apparatus of claim 1 further comprising an inclined plane assembly disposed immediately below a portion of the rail system to assist in conveying the container away from the surface of the water and to the lay-down area.

3. The apparatus of claim 2, wherein the inclined plane assembly includes a motorized conveyor belt to assist in conveying the container away from the surface of the water and to the lay-down area.

4. The apparatus of claim 3, wherein the conveyor belt includes absorbent material to absorb the oil from the water.

5. The apparatus of claim 1, further comprising a containment boom for positioning on the surface of the body of water for collecting the oil in a small area thereby maximizing a depth of the oil on the surface of the body of water.

* * * * *